(12) United States Patent
Zhang et al.

(10) Patent No.: US 12,257,857 B2
(45) Date of Patent: Mar. 25, 2025

(54) OPTICAL ANTI-COUNTERFEITING ELEMENT AND MANUFACTURING METHOD THEREOF

(71) Applicants: ZHONGCHAO SPECIAL SECURITY TECHNOLOGY CO., LTD, Beijing (CN); CHINA BANKNOTE PRINTING AND MINTING CORP., Beijing (CN)

(72) Inventors: Weiwei Zhang, Beijing (CN); Kai Sun, Beijing (CN); Jun Zhu, Beijing (CN)

(73) Assignees: ZHONGCHAO SPECIAL SECURITY TECHNOLOGY CO., LTD, Beijing (CN); CHINA BANKNOTE PRINTING AND MINTING CORP., Beijing (CN)

( * ) Notice: Subject to any disclaimer, the term of this patent is extended or adjusted under 35 U.S.C. 154(b) by 652 days.

(21) Appl. No.: 17/594,579

(22) PCT Filed: Apr. 3, 2020

(86) PCT No.: PCT/CN2020/083197
§ 371 (c)(1),
(2) Date: Oct. 22, 2021

(87) PCT Pub. No.: WO2020/216043
PCT Pub. Date: Oct. 29, 2020

(65) Prior Publication Data
US 2022/0184992 A1   Jun. 16, 2022

(30) Foreign Application Priority Data

Apr. 24, 2019 (CN) .......................... 201910336073.0

(51) Int. Cl.
*B42D 25/373* (2014.01)
*B42D 25/324* (2014.01)
(Continued)

(52) U.S. Cl.
CPC ......... *B42D 25/373* (2014.10); *B42D 25/324* (2014.10); *B42D 25/328* (2014.10);
(Continued)

(58) Field of Classification Search
CPC .. B42D 25/373; B42D 25/324; B42D 25/328; B42D 25/351; B42D 25/445;
(Continued)

(56) References Cited

U.S. PATENT DOCUMENTS

2006/0077496 A1* 4/2006 Argoitia .................... B44F 1/08
359/2
2012/0235399 A1* 9/2012 Lochbihler ............ B42D 25/45
283/94
2017/0015129 A1 1/2017 Jordan

FOREIGN PATENT DOCUMENTS

CN          1597334 A      3/2005
CN          1854944 A      11/2006
(Continued)

*Primary Examiner* — Justin V Lewis
(74) *Attorney, Agent, or Firm* — Shumaker, Loop & Kendrick, LLP; James D. Miller (57) ABSTRACT

The disclose provides an optical anti-counterfeiting element and a manufacturing method of the optical anti-counterfeiting element, the optical anti-counterfeiting element includes: a substrate, the substrate has a first surface and a second surface which are opposite to each other; and an interference color layer located on the first surface of the substrate, the interference color layer is located in a non-hollow area of the optical anti-counterfeiting element and is not located in a hollow area, the interference color layer is a Fabry-Perot filter structure, an absorbing layer of the Fabry-Perot filter structure is in contact with the substrate, and a material of the absorbing layer is an alloy.

19 Claims, 7 Drawing Sheets

(51) Int. Cl.
*B42D 25/328* (2014.01)
*B42D 25/351* (2014.01)
*B42D 25/36* (2014.01)
*B42D 25/415* (2014.01)
*B42D 25/425* (2014.01)
*B42D 25/445* (2014.01)
*B42D 25/45* (2014.01)
*G02B 5/28* (2006.01)

(52) U.S. Cl.
CPC ......... *B42D 25/351* (2014.10); *B42D 25/445* (2014.10); *B42D 25/45* (2014.10); *G02B 5/286* (2013.01)

(58) Field of Classification Search
CPC ...... B42D 25/45; B42D 25/425; B42D 25/36; B42D 25/415; G02B 5/286; G02B 5/28
USPC ....... 283/67, 70, 72, 74, 87, 91, 94, 98, 901
See application file for complete search history.

(56) References Cited

FOREIGN PATENT DOCUMENTS

| | | |
|---|---|---|
| CN | 101767511 A | 7/2010 |
| CN | 102083633 A | 6/2011 |
| CN | 103963510 A | 8/2014 |
| CN | 104647937 A | 5/2015 |
| CN | 105015216 A | 11/2015 |
| CN | 105219148 A | 1/2016 |
| CN | 106891637 A | 6/2017 |
| CN | 107089067 A | 8/2017 |
| CN | 108693582 A | 10/2018 |
| CN | 108773229 A | 11/2018 |
| DE | 102015010744 A1 | 2/2017 |
| EP | 1715392 A1 | 10/2006 |
| EP | 3208099 A1 | 8/2017 |
| WO | 2017000069 A1 | 1/2017 |

* cited by examiner

FIG. 4C tilting the optical security device

OPTICAL ANTI-COUNTERFEITING ELEMENT AND MANUFACTURING METHOD THEREOF

CROSS-REFERENCE TO RELATED PATENT APPLICATION

This patent application is a United States national phase patent application based on PCT/CN2020/083197 filed on Apr. 3, 2020, which claims the benefit of Chinese Patent Application No. 201910336073.0 filed in the China National Intellectual Property Administration (CNIPA) on Apr. 24, 2019, the entire contents of both of which are hereby incorporated herein by reference.

TECHNICAL FIELD

The disclosure relates to the technical field of optical anti-counterfeiting, in particular to an optical anti-counterfeiting element and a manufacturing method of the optical anti-counterfeiting element.

BACKGROUND

Human eyes are very sensitive to colors and color changes, and may distinguish tiny differences between two colors. Therefore, the color change as an optical anti-counterfeiting element is an extremely efficient anti-counterfeiting feature. An optical anti-counterfeiting element based on colors and color changes has been used as an important optical anti-counterfeiting feature and is applied to various fields such as banknote anti-counterfeiting and brand protection. The color changes of the anti-counterfeiting element may be realized through the optical principle, that is, when the optical anti-counterfeiting element is inclined, the color of the optical anti-counterfeiting element changes along with the change of a viewing angle. This color changes are very easy to identify and do not require extensive training for a user. Colors and color changes may be realized in various ways, for example, adopting a metal reflecting layer or coating a layer with colors on the metal reflecting layer to obtain colors, and the colors do not change with the change of the viewing angle. The principle of a Fabry-Perot interferometer may also be adopted, the structure of 'absorbing layer/dielectric layer/reflecting layer' is adopted, and an optically variable plating layer with the colors changing along with the change of the viewing angle is formed. The optical color of the plating layer or the optical anti-counterfeiting element changes during inclining, and therefore, the above structure and the corresponding product are collectively referred to as an 'optically variable film' in the following content of the patent application.

Human eyes also have extremely sensitive perception and resolution capabilities for dynamic features, so that in the field of optical anti-counterfeiting, a unique visual effect formed by utilizing dynamic elements is a common optical anti-counterfeiting form. When an observer changes the viewing angle, for example, the optical anti-counterfeiting element is inclined, or the illumination direction of a light source is changed, or the observation direction of the observer is changed, the positions and/or shapes of certain specific image-text elements in the optical anti-counterfeiting element change. The change features such as position movement and shape change are easy to identify, so that the observer may feel an obvious dynamic effect in an extremely short time, such as a few seconds, without too much training for the observer.

In certain positions of the optical anti-counterfeiting element, the corresponding optically variable film is removed, so that an effect which is different from that of the optically variable film may be formed, and through reasonable design, patterns or numbers with specific meanings may be formed.

The color changes, the dynamic features and hollow image-text are combined, so that when the optical anti-counterfeiting element is moved or inclined, while the color changes and the dynamic changes occur, the optical anti-counterfeiting element is provided with fixed patterns or numbers, and a determined meaning is shown. For example, in use as security threads of banknotes, banknote denominations, or symbols of countries and regions, or the like are formed. By means of the combination mode, the effect of being easier to identify may be formed, and thus the anti-counterfeiting capacity is improved.

A hollowing process has a great relationship with the type of the optically variable film. An existing optically variable film generally adopts the structure of 'absorbing layer/dielectric layer/reflecting layer', the absorbing layer serves as a semi-reflecting and semi-transmitting layer, gray metal with the refractive index n similar to the extinction coefficient k is generally adopted, and the common gray metal is nickel, chromium and the like. The dielectric layer generally adopts a transparent dielectric material, such as cryolite, magnesium fluoride and silicon oxide. The reflecting layer generally adopts a metal material with relatively small refractive index n and relatively large extinction coefficient k, such as silver and aluminum. By taking a common material combination as an example, the absorbing layer adopts metal chromium, the dielectric layer adopts magnesium fluoride, and the reflecting layer adopts metal aluminum. When the optically variable film adopts the structure of 'substrate/absorbing layer/dielectric layer/reflecting layer', that is, when the color of the optically variable film needs to be observed through a substrate, if a traditional alkali washing hollowing mode is adopted, as chromium of the absorbing layer may not be corroded by alkali liquor, the optically variable film on the substrate may not be completely removed, and metal chromium and magnesium fluoride thereon still remain on the substrate. Under this circumstance, a hollow area may show a gray black appearance when being observed through the substrate, and the expression of the hollowing effect is influenced. As a substitute for the metal chromium layer of the absorbing layer, metal aluminum may be used for replacing metal chromium, and under this circumstance, an optically variable film with a certain optically variable effect may be formed. However, the refractive index n of metal aluminum is far smaller than the extinction coefficient k, so that the color saturation of the front surface of the optically variable film is relatively low, and the anti-counterfeiting effect is reduced.

SUMMARY

Some embodiments of the disclosure provide an optical anti-counterfeiting element and a manufacturing method of the optical anti-counterfeiting element, for solving or at least partially solving the above-mentioned technical problems.

In an embodiment, the disclosure provides an optical anti-counterfeiting element, The optical anti-counterfeiting element includes: a substrate, the substrate has a first surface and a second surface which are opposite to each other; and an interference color layer located on the first surface of the substrate, the interference color layer is located in a non-hollow area of the optical anti-counterfeiting element and is not located in a hollow area, the interference color layer is a Fabry-Perot filter structure, an absorbing layer of the Fabry-Perot filter structure is in contact with the substrate, and a material of the absorbing layer is an alloy.

In an embodiment, the disclosure provides an optical anti-counterfeiting element. The optical anti-counterfeiting element includes: a substrate, the substrate has a first surface and a second surface which are opposite to each other; a surface relief structure layer located on the first surface of the substrate, and the surface relief structure layer includes a first area aligned with a hollow area of the optical anti-counterfeiting element and a second area aligned with a non-hollow area of the optical anti-counterfeiting element, the first area includes a first grating microstructure, the second area includes a second grating microstructure and/or a flat structure, wherein a depth-to-width ratio of the first grating microstructure is greater than a depth-to-width ratio of the second grating microstructure, and/or a specific volume of the first grating microstructure is greater than a specific volume of the second grating microstructure; an interference color layer covering the second area homomorphically, the interference color layer is located in the non-hollow area of the optical anti-counterfeiting element and is not located in the hollow area, the interference color layer is a Fabry-Perot filter structure, an absorbing layer of the Fabry-Perot filter structure is in contact with the second area, and a material of the absorbing layer is an alloy.

In an embodiment, the disclosure provides a manufacturing method of the optical anti-counterfeiting element. The manufacturing method includes the following steps: providing a substrate, and the substrate has a first surface and a second surface which are opposite to each other; sequentially depositing an absorbing layer, a dielectric layer and a reflecting layer which are formed by an alloy on the first surface of the substrate, and the absorbing layer, the dielectric layer and the reflecting layer form an interference color layer of a Fabry-Perot filter structure; printing a protection layer on the reflecting layer; immersing the structure formed in the preceding step into a corrosive solution so that the interference color layer in a hollow area of the optical anti-counterfeiting element is corroded; taking out and washing the corroded structure.

In an embodiment, the disclosure provides a manufacturing method of the optical anti-counterfeiting element. The manufacturing method includes the following steps: providing a substrate, and the substrate has a first surface and a second surface which are opposite to each other; forming a surface relief structure layer on the first surface of the substrate, and the surface relief structure layer includes a first area aligned with a hollow area of the optical anti-counterfeiting element and a second area aligned with a non-hollow area of the optical anti-counterfeiting element, the first area includes a first grating microstructure, the second area includes a second grating microstructure and/or a flat structure, a depth-to-width ratio of the first grating microstructure is greater than a depth-to-width ratio of the second grating microstructure, and/or a specific volume of the first grating microstructure is greater than a specific volume of the second grating microstructure; sequentially depositing an absorbing layer, a dielectric layer and a reflecting layer which are formed by an alloy on the surface relief structure layer, and the absorbing layer, the dielectric layer and the reflecting layer form an interference color layer of a Fabry-Perot filter structure; printing a protection layer on the reflecting layer; immersing the structure formed in the preceding step into a corrosive solution so that the interference color layer in the first area is corroded; taking out and washing the corroded structure.

According to the above-mentioned technical solution, the alloy is adopted as the absorbing layer, so that the optical anti-counterfeiting element may successfully realize all hollowing of the optically variable film while keeping high color saturation, the contradiction between color saturation and hollowing in the prior art is solved, and the combination of multiple optical anti-counterfeiting effects is realized.

Further features and advantages of the embodiments of the disclosure will be explained in detail in the following specific implementation modes.

BRIEF DESCRIPTION OF THE DRAWINGS

The drawings are provided to provide a further understanding of the embodiments of the disclosure and constitute a part of this specification, and together with the following specific implementation modes, serve to explain the embodiments of the disclosure but do not constitute a limitation of the embodiments of the disclosure. In the drawings.

DETAILED DESCRIPTION OF THE EMBODIMENTS

The specific implementation modes of the embodiments of the disclosure will be described in detail below with reference to the drawings. It is to be understood that the specific implementation modes described herein are for the purpose of illustrating and explaining the embodiments of the disclosure only and are not intended to limit the embodiments of the disclosure.

An embodiment of the disclosure provides an optical anti-counterfeiting element. The optical anti-counterfeiting element may include a substrate, the substrate has a first surface and a second surface which are opposite to each other; and an interference color layer, The interference color layer is located on the first surface of the substrate, the interference color layers are located in a non-hollow area of the optical anti-counterfeiting element and are not located in a hollow area, the interference color layer is a Fabry-Perot filter structure, an absorbing layer of the Fabry-Perot filter structure is in contact with the substrate, and a material of the absorbing layer is an alloy. In the embodiment of the disclosure, the Fabry-Perot filter structure is also referred to as an optically variable film, and the two are used interchangeably with each other. An alloy is adopted as the absorbing layer, so that the optical anti-counterfeiting element may successfully realize all hollowing-out of the optically variable film while keeping high color saturation, the contradiction between color saturation and hollowing-out in the prior art is solved, and the combination of multiple optical anti-counterfeiting effects is realized.

In the embodiment of the disclosure, the substrate may be configured to be transparent or semitransparent to facilitate observation of the optical features of the optical anti-counterfeiting element by an observer through the second surface of the substrate.

In the optical anti-counterfeiting element, the Fabry-Perot filter structure is 'absorbing layer/dielectric layer/reflecting layer' from the direction of the substrate, that is, the absorbing layer of the Fabry-Perot filter structure is in direct contact with the substrate or a surface relief structure described later.

In the Fabry-Perot filter structure, the absorbing layer serves as a beam splitter, reflecting half of light (referred to as a light beam 1) and enabling half of light to transmit. After passing through the dielectric layer, the transmitting light is reflected by the reflecting layer and then is emitted through the absorbing layer (referred to as a light beam 2), the light beam 1 and the light beam 2 interact to generate interference, selection enhancement of specific wavelength is formed, and thus colors may be observed. When the incidence direction of the light changes, the optical path of the light beam in the dielectric layer changes, if the dielectric material is a high-refractive-index material, the colors are not changed or are not changed obviously, and if the dielectric material is a low-refractive-index material, the colors are changed obviously, and an optically variable effect is achieved. For example, the Fabry-Perot filter structure may be metal chromium/silicon dioxide/(metal aluminum or metal aluminum/aluminum trioxide/metallic aluminum), and the colors of the Fabry-Perot interferometer may change when the viewing angle is changed.

In the above structure, the absorbing layer of the Fabry-Perot filter structure may be an alloy formed of at least two metals, such as aluminum/chromium alloy, aluminum/nickel alloy, aluminum/silicon alloy, iron/chromium, and aluminum/iron/chromium alloy.

The alloy of the absorbing layer is an alloy formed by at least two metals, one of the metals may be a gray metal, a refractive index n and an extinction coefficient k in optical parameters of the metal are similar, and the metal includes but is not limited to chromium, nickel, copper, cobalt, titanium, vanadium, tungsten, tin, silicon, germanium and a combination of chromium, nickel, copper, cobalt, titanium, vanadium, tungsten, tin, silicon and germanium. The other metal may be a metal that is susceptible to corrosion by solution, such as aluminum and iron, wherein, as a thin film material, aluminum is susceptible to corrosion by alkali liquor and iron is susceptible to corrosion by acid liquor. In the embodiment, a thickness of the absorbing layer may optionally range from 2 nm to 30 nm.

The dielectric layer may be a low-refraction dielectric layer material with the refractive index n smaller than 1.8, and may be an oxide such as silicon dioxide, silicon oxide, cryolite and aluminum oxide, or a fluoride such as magnesium fluoride, or other metal compounds. The thickness of the dielectric layer depends on the desired color and is generally greater than 200 nm.

The dielectric layer may also be a high-refractive-index dielectric material with the refractive index n not smaller than 1.8, and may be an oxide such as $TiO_2$ and $ZrO_2$, or a sulfide such as ZnS, or other metal compounds such as titanium nitride. The thickness is generally greater than 100 nm. It is to be noted that due to the fact that the refractive index of the high-refractive-index material is high, the color change is small when the optical anti-counterfeiting element is inclined, but certain change is still reflected in the aspects of saturation and hue angle, and therefore, the Fabry-Perot filter structure with the dielectric layer may still be referred to as the optically variable film.

In the above structure, the reflecting layer requires a metallic material or a non-metallic material having a relatively high reflectivity, including but not limited to any of aluminum, silver, tin, nickel, chromium, platinum, copper, gold, silicon, or a combination of aluminum, silver, tin, nickel, chromium, platinum, copper, gold and silicon, with a thickness greater than or equal to 10 nm.

The substrate may be, for example, polyethylene terephthalate (PET). When the product structure is 'PET/reflecting layer/dielectric layer/absorbing layer', the observer needs to observe the optically variable film from the direction of the absorbing layer, and the optically variable film is referred to as the 'positive structure' optically variable film; and on the contrary, when the product structure is 'PET/absorbing layer/dielectric layer/reflecting layer', the observer needs to observe the absorbing layer through the PET from the side of the PET, and the optically variable film is referred to as the 'reverse structure' optically variable film.

In a conventional optically variable film, an absorbing layer generally adopts a single gray metal, this is because the refractive index n of the gray metal is similar to the extinction coefficient k of the gray metal, the absorbing layer may be used as a good semi-reflecting and semi-transmitting film and further applied to a Fabry-Perot interference plating layer to form an optically variable film with high saturation, and bright and vivid colors may be realized under the conditions of vertical observation and oblique observation. In the material selection of the absorbing layer, metal chromium is generally adopted as the material of the absorbing layer. Metal chromium has good physical and chemical resistance, may achieve corrosion resistance of acids and alkali, has relatively close refractive index n and extinction coefficient k (for example, n=2.38, k=2.97 at 550 nm), and may show a vivid color in the combination of 'chromium/magnesium fluoride/aluminum', for example. However, when pure gray metal is used, particularly when metal chromium is used, chromium has extremely good physical and chemical resistance, so that certain difficulty exists when hollowed-out patterns are formed by adopting traditional alkali liquor corrosion. Particularly, when metal chromium of the absorbing layer in the 'reverse structure' optically variable film is in contact with the substrate, corrosion of metal chromium may not be basically achieved in an alkali liquor corrosion mode, and only metal aluminum on the surface may be corroded. However, due to the fact that metal chromium is still reserved on the substrate and the semi-reflecting and semi-transmitting property of metal chromium, no matter viewing through the transparent substrate or from the aluminum face, a hollow area is gray black, and complete transparency may not be realized. In this way, it is limited that the designed patterns may not be well expressed.

Aluminum is used as a common material and may be corroded by alkali liquor, so that aluminum is commonly used in a pattern plating layer, aluminum covers the plating layer in a mode of printing a dealuminizing protection layer to play a protection role, and the unprotected and exposed part may be quickly corroded by hot alkali liquor. However, due to optical parameters of aluminum (for example, the refractive index n=0.76 and the extinction coefficient k=5.32 at 550 nm), when aluminum is used as the absorbing layer, the optically variable film is poor in color saturation, and thus vivid colors may not be realized. Therefore, in the disclosure, the gray metal capable of achieving high saturation color is combined with the metal capable of being corroded by a corrosive solution is combined to form an alloy as the absorbing layer. The optically variable film adopting the alloy absorbing layer not only may obtain a color with relatively high saturation, but also may perform corrosion hollowing of the 'reverse structure' optically variable film in a specific common corrosive solution.

Aiming at the above optical anti-counterfeiting element, the embodiment of the disclosure further provides a manufacturing method of the optical anti-counterfeiting element, including: providing a substrate, and the substrate has a first surface and a second surface which are opposite to each other; sequentially depositing an absorbing layer, a dielectric layer and a reflecting layer which are formed by an alloy on the first surface of the substrate, and the absorbing layer, the dielectric layer and the reflecting layer form an interference color layer of a Fabry-Perot filter structure; printing a protection layer on the reflecting layer, and the protection layer has an image-text information with specific meaning to form a non-hollow area of the anti-counterfeiting element; immersing the structure formed in the preceding step into a corrosive solution so that the interference color layer in a hollow area of the optical anti-counterfeiting element is corroded; taking out and washing the corroded structure, and thus the optical anti-counterfeiting element is obtained.

Optionally, the protection layer may be protective glue.

Each layer of the interference color layer of the Fabry-Perot filter structure is formed by one or more of the following methods: an evaporation deposition method, an electron beam evaporation deposition method, or a magnetron sputtering deposition method. In the above manufacturing method, the selection of the substrate, the absorbing layer, the dielectric layer, the reflecting layer and the like please refer to the above description of the optical anti-counterfeiting element and will not be elaborated here.

Further optionally, in the embodiment of the disclosure, the Fabry-Perot filter structure of which the material of the absorbing layer is an alloy may also be combined with a surface relief structure layer, in-situ hollowing of the reverse structure optically variable film in a specific area is realized through the modulation effect of a microstructure in the surface relief structure layer, and thus better hollowing precision and pattern positioning precision are obtained.

Specifically, the optical anti-counterfeiting element includes a substrate, and the substrate has a first surface and a second surface which are opposite to each other; a surface relief structure layer located on the first surface of the substrate, the surface relief structure layer includes a first area aligned with a hollow area of the optical anti-counterfeiting element and a second area aligned with a non-hollow area of the optical anti-counterfeiting element, the first area includes a first grating microstructure, the second area includes a second grating microstructure and/or a flat structure, wherein a depth-to-width ratio of the first grating microstructure is greater than a depth-to-width ratio of the second grating microstructure, and/or a specific volume of the first grating microstructure is greater than the specific volume of the second grating microstructure; an interference color layer covering the second area homomorphically, the interference color layer is located in the non-hollow area of the optical anti-counterfeiting element and is not located in the hollow area, the interference color layer is a Fabry-Perot filter structure, an absorbing layer in the Fabry-Perot filter structure is in contact with the second area, and a material of the absorbing layer is an alloy.

More specifically, the disclosure provides a manufacturing method of the optical anti-counterfeiting element correspondingly. The manufacturing method may include: providing a substrate, and the substrate has a first surface and a second surface which are opposite to each other; forming a surface relief structure layer on the first surface of the substrate, and the surface relief structure layer includes a first area aligned with a hollow area of the optical anti-counterfeiting element and a second area aligned with a non-hollow area of the optical anti-counterfeiting element, the first area includes a first grating microstructure, the second area includes a second grating microstructure and/or a flat structure, wherein a depth-to-width ratio of the first grating microstructure is greater than a depth-to-width ratio of the second grating microstructure, and/or a specific volume of the first grating microstructure is greater than a specific volume of the second grating microstructure; sequentially depositing an absorbing layer, a dielectric layer and a reflecting layer which are formed by an alloy on the surface relief structure layer, and the absorbing layer, the dielectric layer and the reflecting layer form an interference color layer of a Fabry-Perot filter structure; printing a protection layer on the reflecting layer; immersing the structure formed in the preceding step into a corrosive solution so that the interference color layer in the first area is corroded; taking out and washing the corroded structure, and thus the optical anti-counterfeiting element is obtained.

Each layer of the interference color layer of the Fabry-Perot filter structure is formed by one or more of the following methods: an evaporation deposition method, an electron beam evaporation deposition method, or a magnetron sputtering deposition method.

In the embodiment of the disclosure, the specific volume of the grating microstructure refers to the ratio of the volume of liquid which just completely covers the surface of the grating microstructure to the projection area of the surface of the grating microstructure on the horizontal plane under the condition that the grating microstructure is in a horizontal state.

An optically variable film or other coating materials, such as a dielectric layer or an absorption layer, do not exist in the hollow area of the optical anti-counterfeiting element, the transmittance of the hollow area is 85% or above, the Fabry-Perot filter structure is arranged on the non-hollow area, and features with specific dynamic and/or other colors different from that of the optically variable plating layer may be formed.

A product structure and method for obtaining a hollowing effect through a special microstructure and a coating process are disclosed in the Chinese patent with the publication number CN106891637A. In the method, a precise hollowing method is disclosed, a covering protection layer is formed on an area with a specific microstructure in a manner of coating the protection layer, no protection layers or few protection layers are formed on other areas, so that protection for a plating layer in a specific area and hollowing of plating layers in other areas are realized, and a final precise hollowing effect is obtained. However, in the method, a hollowed-out material and the product structure still have abovementioned problems, that is, when an optically variable film is combined with the structure, especially when a reverse structure optically variable film is combined with a dynamic microstructure, a specific optical effect needs to be observed through a transparent substrate, and if an absorbing layer adopts a traditional chromium layer at this point, the chromium layer may not be corroded and hollowed out by common alkali liquor corrosion. If an alloy is adopted as the absorbing layer, high color saturation may be realized, and the absorbing layer also may be hollowed and corroded by a corresponding corrosive solution, especially hot alkali liquor commonly used in the industry. By adopting the specific microstructure and coating process, the surface plating layer only in the area occupied by the hollowing grating microstructure may be completely hollowed out, and the positioning precision and the hollowing precision are higher than those of hollowing in an existing mode of printing a hollowed-out protection layer.

When the grating microstructure of the hollow area has a relatively high depth-to-width ratio, a thickness of the plating layer deposited on the grating is relatively small, but a thickness of the plating layer deposited on the low-aspect-ratio grating or the flat surface of the non-hollow area is relatively large. When soaked in the corresponding corrosive solution meanwhile, the plating layer in the hollow area is more easily corroded by the corrosive solution, and the plating layer in the non-hollow area may be reserved due to the fact that the thickness is large, so that hollowing of the specific area is formed.

In another hollowing method, a grating in a hollow area has a relatively large specific volume. When the surface of a surface relief structure layer is coated with a protection layer, the protection layer more fills the bottom of a microstructure in grating area with a large specific volume, and the filling amount of the protection layer is small relative to the size of the microstructure. In a non-hollow area, the protection layer may fully fill the surface of the grating microstructure or cover the surface of a flat area to form protection for a reserved area. When passing through a corresponding corrosive solution, the corrosive solution may corrode an unprotected or insufficiently protected plating layer in the hollow area, and the plating layer in the reserved area is fully protected by the protection layer and reserved, so that the hollowing of a specific area may be formed.

A feature size of the first grating microstructure and/or the second grating microstructure of the hollow area may optionally range from 100 nm to 100 μm.

The depth-to-width ratio of the second grating microstructure of the non-hollow area may be smaller than 0.2, and/or the specific volume of the second grating microstructure is smaller than 0.2.

The first grating microstructure or the second grating microstructure is one or more of the following: a sub-wavelength grating, a holographic grating, a blazed grating, a ball lens, or a cylindrical lens, or the first grating microstructure and the second grating microstructure are one or more of the following: a sub-wavelength grating, a holographic grating, a blazed grating, a ball lens, or a cylindrical lens.

An alloy is adopted as an absorbing layer, meanwhile, by utilizing a modulating effect of the microstructure, the optical anti-counterfeiting element may successfully realize accurate hollowing of an optically variable film while keeping high color saturation, the contradiction between color saturation and hollowing in the related art is solved, and the combination of multiple optical anti-counterfeiting effects is realized.

Figure 1A:
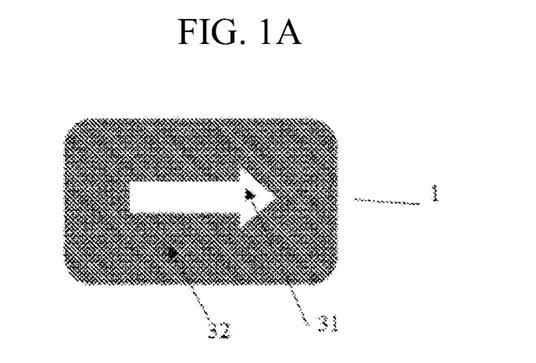
FIG. 1A shows a schematic diagram of an optical anti-counterfeiting element according to an embodiment of the disclosure.

FIG. 1A shows a schematic diagram of an optical anti-counterfeiting element according to an embodiment of the disclosure. As shown in FIG. 1A, the optical anti-counterfeiting element 1 has a hollow area 31 and a non-hollow area 32. When the optical anti-counterfeiting element 1 is directly observed, a graphic arrow formed by the hollow area 31 may be seen, and the non-hollow area is an optically variable film, so that obvious contrast is formed.

Figure 1B:
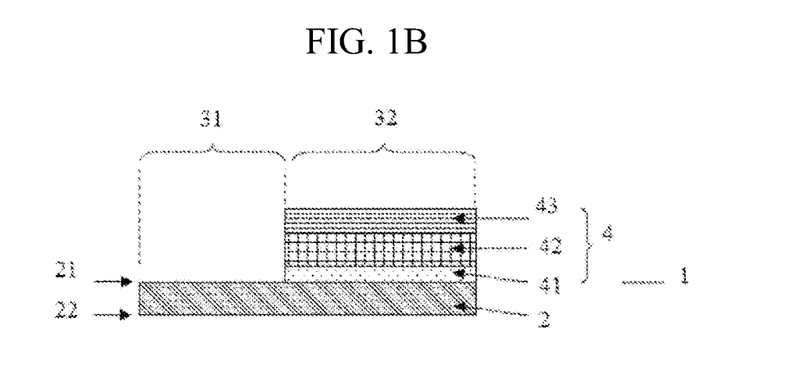
FIG. 1B shows a schematic diagram of a cross-sectional view of the optical anti-counterfeiting element as shown in FIG. 1A.

FIG. 1B shows a schematic diagram of a cross-sectional view of the optical anti-counterfeiting element as shown in FIG. 1A. A substrate 2 is a transparent substrate. The area, corresponding to a hollow area 31, of a first surface 21 of the substrate 2 is not provided with any plating layer, the area, corresponding to a non-hollow area 32, of the first surface 21 of the substrate 2 is provided with a Fabry-Perot filter structure (hereinafter referred to as an 'optically variable film') 4, an absorbing layer 41 is in contact with the substrate 2, a dielectric layer 42 is arranged on the absorbing layer 41, and a reflecting layer 43 is arranged on the dielectric layer 42. When observing the optical anti-counterfeiting element, it is necessary to observe from a second surface 22 of the substrate 2.

In the embodiment, the substrate 2 is PET, and the substrate 2 is transparent. The absorbing layer 41 is aluminum-chromium alloy (Al/Cr) having an atomic ratio of metal aluminum to metal chromium of 9:1 and a thickness of about 8 nm. The dielectric layer 42 is silicon dioxide and has a thickness of about 400 nm. The reflecting layer 43 is metal aluminum and has a thickness of 30 nm.

Figure 2A:
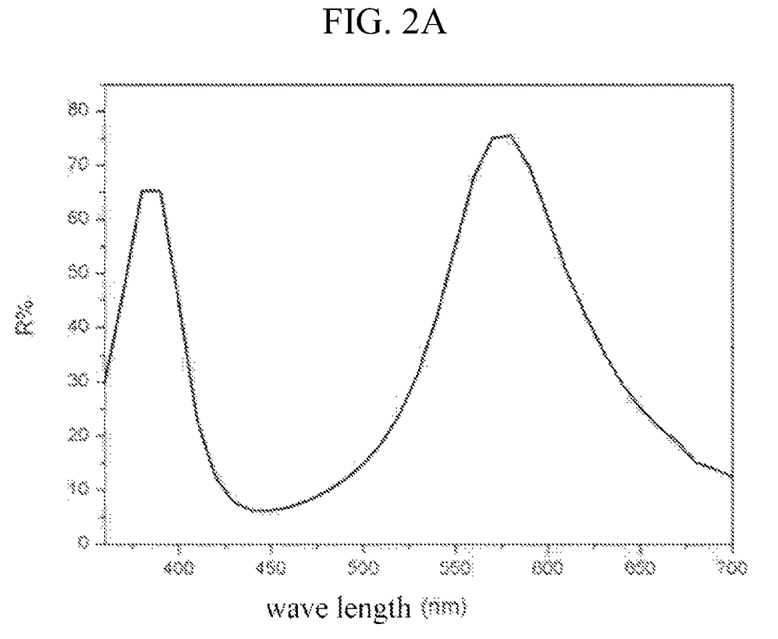
FIG. 2A shows a reflection spectrogram of an optically variable film with chromium as an absorbing layer.
Figure 2B:
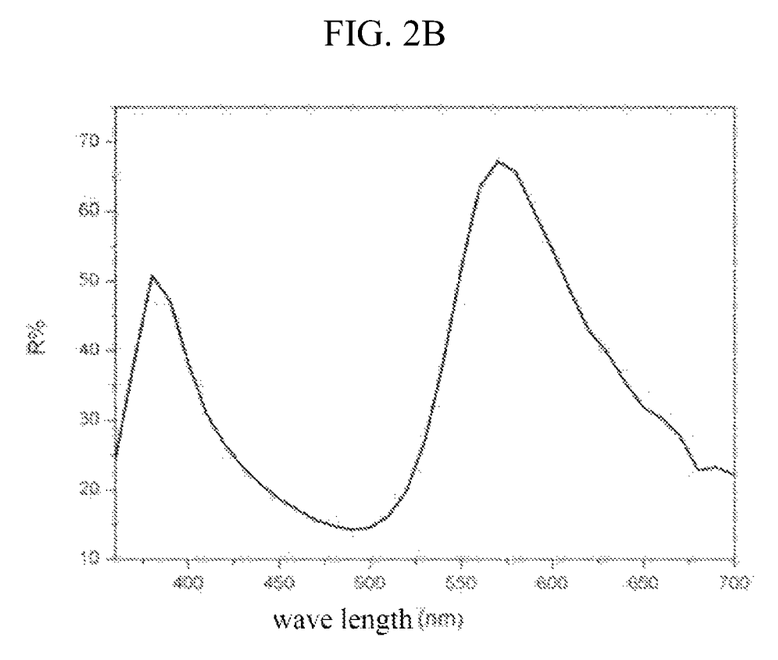
FIG. 2B shows a reflection spectrogram of an optically variable film with aluminum-chromium alloy as an absorbing layer.
Figure 2C:
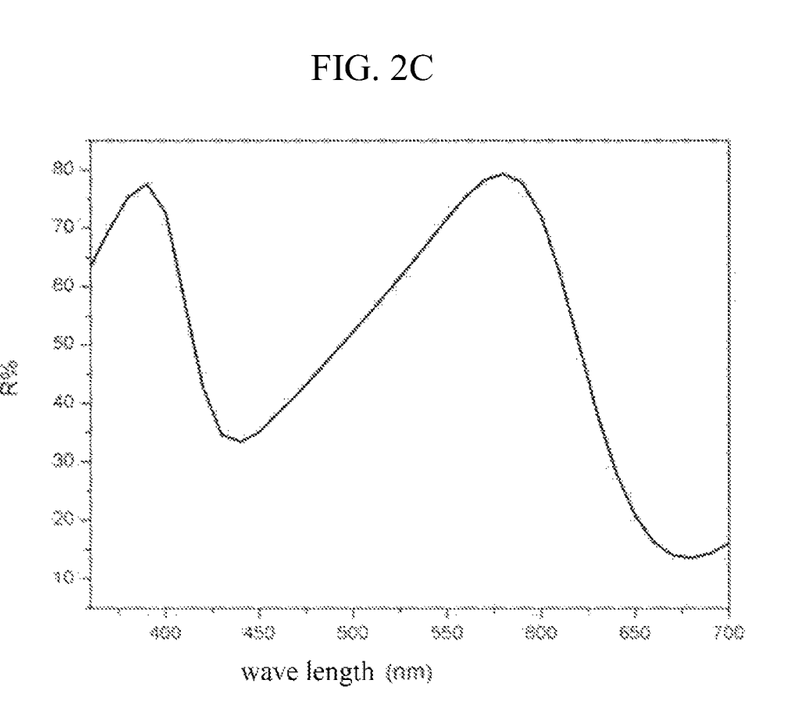
FIG. 2C shows a reflection spectrogram of an optically variable film with aluminum as an absorbing layer.

FIG. 2A shows a reflection spectrogram of an optically variable film with chromium as an absorbing layer; FIG. 2B shows a reflection spectrogram of an optically variable film with aluminum-chromium alloy as an absorbing layer; and FIG. 2C shows a reflection spectrogram of an optically variable film with aluminum as an absorbing layer. Table 1 shows color parameters of the optically variable film when the above three materials are used as the absorbing layers respectively.

TABLE 1

| Absorbing layer types | h (Hue/Hue angle) | C (Saturation) | L (Brightness) |
|---|---|---|---|
| Cr | 85.9° | 64.4 | 72.7 |
| Al/Cr | 80.9° | 48.7 | 74 |
| Al | 111° | 28 | 83.8 |

It can be found from the table and data that when Cr serves as the absorbing layer, the color is bright, and the saturation degree is the highest; and when aluminum serves the absorbing layer, the color is relatively dim, and the saturation degree is relatively low. When Al/Cr alloy is used as the absorbing layer, the color saturation is relatively high, and the color requirement may be met. When Al is used as the absorbing layer, the color saturation of the optically variable film is relatively low, and a bright color may not be realized. Therefore, Al/Cr alloy may be used as the absorbing layer to replace Cr as a selection of the absorbing layer of the optically variable film.

Figure 3A:
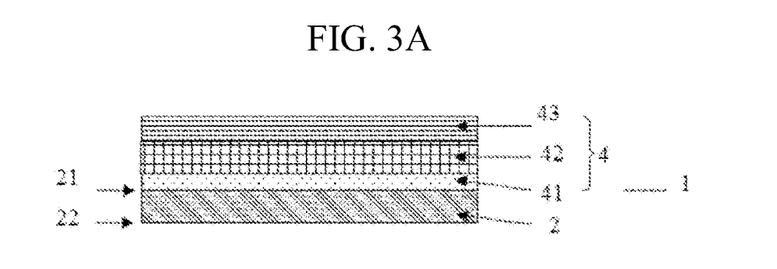
FIGS. 3A-3C show schematic diagrams of a manufacturing process of the optical anti-counterfeiting element according to an embodiment of the disclosure.
Figure 3B:
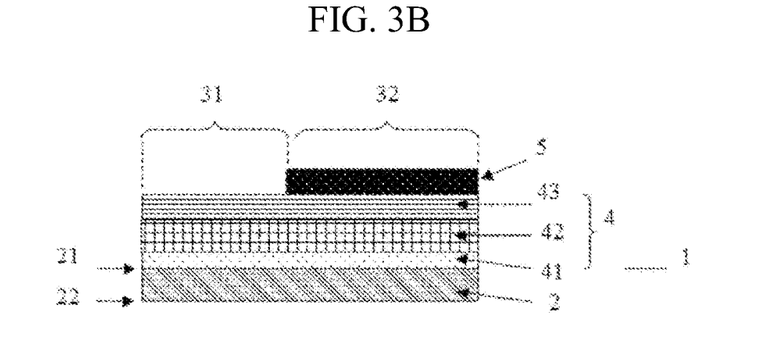
Figure 3C:
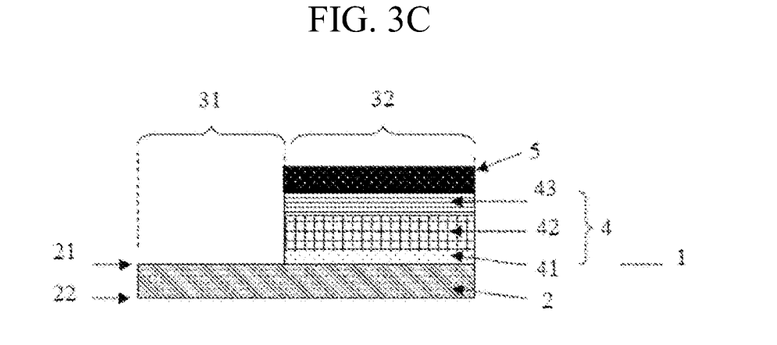

In common production, hot alkali liquor is a commonly used corrosive solution capable of corroding various metals, especially metal aluminum. In order to realize patterning of the optically variable film, the optically variable film in a specific area needs to be removed, so that different areas have different optical appearances, and then the patterning is realized. FIGS. 3A-3C illustrate schematic diagrams of manufacturing process of the optical anti-counterfeiting element. The specific flow is as follows. (a): sequentially depositing an alloy absorbing layer 41 (for example, Al/Cr alloy), a dielectric layer 42 (for example, magnesium fluoride) and a reflecting layer 43 (for example, aluminum) on a first surface 21 of a transparent substrate 2 (for example, PET), and the absorbing layer 41, the dielectric layer 42 and the reflecting layer 43 form a Fabry-Perot filter structure 4, as shown in FIG. 3A; (b): printing a protection layer 5 on the surface of the reflecting layer 43, and the protection layer, for example, may be protective glue, the protection layer 5 may be printed or coated in a traditional printing manner, and the protection layer 5 may has image-text information with specific meaning to form a non-hollow area of the anti-counterfeiting element; (c): immersing the structure into a corrosive solution, the corrosive solution, for example, may be common industrial alkali liquor, as shown in FIG. 3B; (d): taking out and washing the structure, and thus the final optical anti-counterfeiting element 1 is obtained, as shown in FIG. 3C. It is to be noted that the manufacturing method of the optical anti-counterfeiting element according to the embodiment is the same as or similar to the specific implementation details and benefits of the optical anti-counterfeiting element according to the above embodiment, and will not be elaborated here.

Figure 4A:
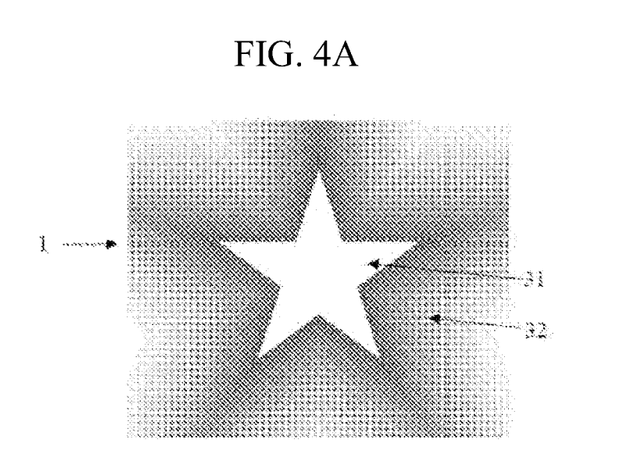
FIG. 4A shows a schematic diagram of an optical anti-counterfeiting element according to another embodiment of the disclosure.

FIG. 4A shows a schematic diagram of another optical anti-counterfeiting element according to an embodiment of the disclosure. In the optical anti-counterfeiting element 1, a hollow area 31 is in a pentagram shape and is hollowed-out and light-transmitting integrally; a non-hollow area 32 has an optically variable film which is colorful, and on the basis of the colorful feature, light and shade difference is achieved.

Figure 4B:
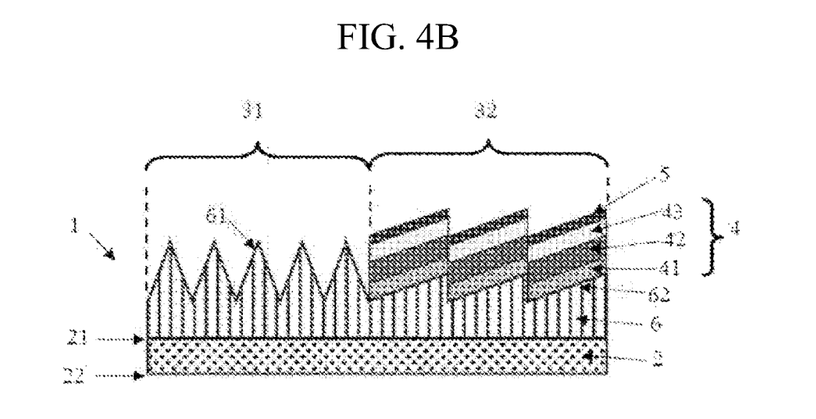
FIG. 4B shows a schematic diagram of a cross-sectional view of the optical anti-counterfeiting element as shown in FIG. 4A.

FIG. 4B is a schematic diagram of a cross-sectional view of the optical anti-counterfeiting element as shown in FIG. 4A. A surface relief structure layer 6 is arranged on a transparent substrate 2 (for example, PET), the surface relief structure layer includes a first area aligned with a hollow area 31 of the optical anti-counterfeiting element and a second area aligned with a non-hollow area 32 of the optical anti-counterfeiting element, the first area includes a first grating microstructure 61 (for example, symmetric wedge-shaped gratings), and the second area includes a grating microstructure 62 (for example, a blazed grating). Further, a Fabry-Perot filter structure 4 (namely, an optically variable film) covering the grating microstructure (62) of the second area in a same shape is provided, an alloy absorbing layer (41) (for example, Cr/Fe alloy) in the Fabry-Perot filter structure is in contact with the second area, a dielectric layer (42) is cryolite, for example, and a reflecting layer is silver, for example. No optically variable film is arranged on the grating microstructure 61. Optionally, a protection layer 5 may be formed on the reflecting layer 43.

In the above structure, the surface relief structure layer 6 may be an ultraviolet curing material or a thermoforming material, and the required microstructure may be formed on the transparent substrate 2 under specific conditions. In the embodiment, the grating microstructure 61 in the hollow area 31 may be symmetric wedge-shaped gratings with a feature period (or feature size) of 20 µm and a depth of 8 µm. The grating microstructure 62 in the non-hollow area 32 is a blazed grating with a feature period of 15 µm, and a depth changing from 0.1 µm to 5 µm according to a certain arrangement mode. The change rule may be seen in the Chinese patent application with the publication number of CN102712207B, and various features such as dynamic sense, relief and three-dimensional sense may be formed. In the embodiment, the absorbing layer 41 is Cr/Fe alloy with an atomic ratio of Cr/Fe=0.7/0.93 and a thickness of about 8 nm; the dielectric layer 42 is cryolite with a thickness of about 520 nm; and the reflecting layer 43 is metal silver with a thickness of about 50 nm.

Figure 4C:
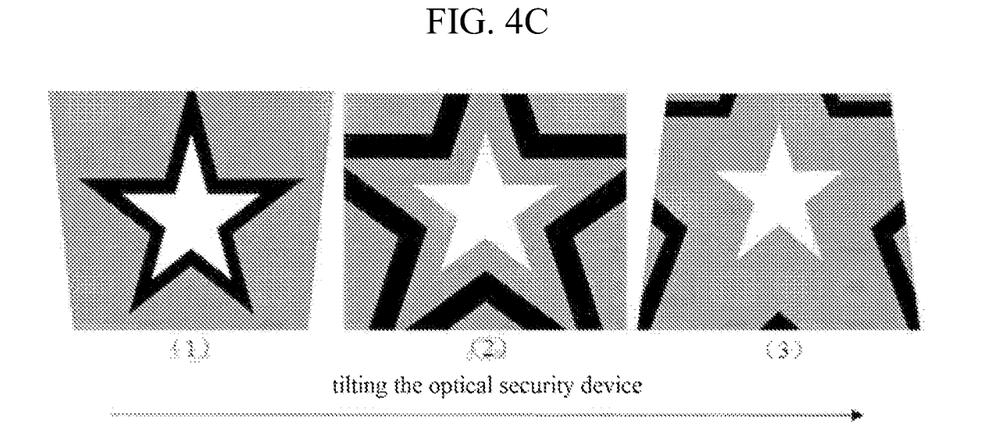
FIG. 4C shows a schematic diagram of an effect of an inclining process of the optical anti-counterfeiting element as shown in FIG. 4A.

When viewed from the front, the optical anti-counterfeiting element 1 shows the pattern as shown in the first FIG. 1) in FIG. 4C, the five-pointed star of the middle hollow area 31 shows a completely hollowed-out transparent state, the outline of the innermost five-pointed star of the non-hollow area 32 shows a bright magenta color, and the brightness of the other areas is relatively low. The reason is that through proper adjustment and setting of the angle of the blazed grating, only light reflected by the blazed grating on the innermost enters the eyes of an observer during front observation, then only the pattern on the innermost shows bright magenta, the blazed grating in other areas reflects the light to other positions so that the light may not enter the eyes of the observer, therefore, the brightness is relatively low, and obvious light-shade contrast is formed. When the optical anti-counterfeiting element 1 is inclined, at another angle, the blazed grating in the middle may reflect light into the eyes of the observer, so that the brightness of the middle becomes relatively strong and the brightness at other positions is relatively low. With inclining continuing, similarly, the outermost blazed grating reflects light into the eyes of the observer, and then the outermost circle becomes the brightest. Thus, the bright magenta profile spreads from the center to the outside with the action of inclining throughout the course of inclining change (referring to the second FIG. 2) and the third FIG. 3) in FIG. 4C), and a dynamic change with the inclining process is formed. It is to be particularly noted that, first, according to the embodiment of the disclosure, the hollow area is determined by a specific microstructure, the appearance of which is represented by a dynamic contour having a hollowed-out shape, the dynamic contour may not be overlapped with the hollowed-out shape, or the hollow area and the dynamic area are strictly defined and positioned, and there is no superposition interference between the two. Second, the hollow area is free of any optically variable plating layer, and the appearance effect of complete transparency is shown.

Figure 5A:
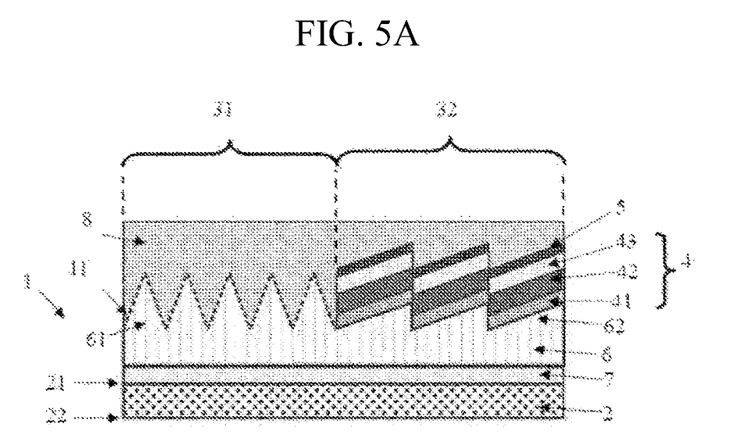
FIG. 5A shows a schematic diagram of a cross-sectional view of an optical anti-counterfeiting element with a release layer and a lacquer layer according to an embodiment of the disclosure.
Figure 5B:
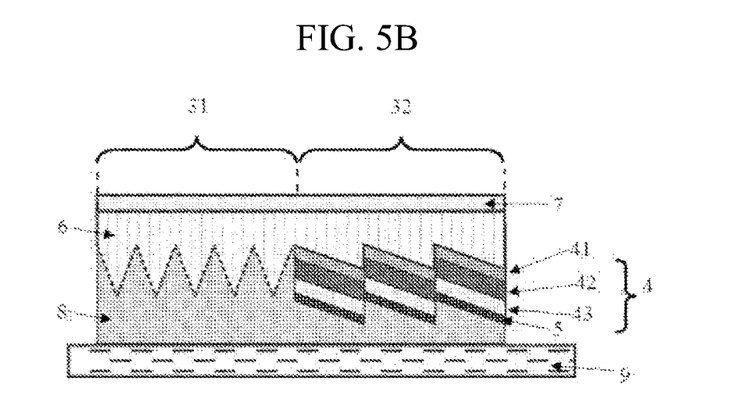
FIG. 5B shows a schematic diagram of a cross-sectional view of an optical anti-counterfeiting element transferred to a product bearing substrate according to an embodiment of the disclosure.

FIG. 5A shows a schematic diagram of a cross-sectional view of an optical anti-counterfeiting element with a release layer and a lacquer layer according to an embodiment of the disclosure. In the embodiment, the structure of the optical anti-counterfeiting element 1 is similar to that of FIGS. 4A-4B, with the exception that a release layer 7 is formed between a substrate 2 and a surface relief structure layer 6, with a lacquer layer 8 on the outermost layer of the element, and with the surface of the lacquer layer 8 planarized. The release layer 7 may be an acrylate material or the like and is characterized by being able to be stripped from the substrate 2 when heated, the lacquer layer 8 allows the optical anti-counterfeiting element 1 to be bonded to a product bearing substrate 9 (for example, paper or BOPP or the like), the optical anti-counterfeiting element 1 is transferred to a product bearing substrate 9 (for example, paper or BOPP), and the surface originally in contact with the substrate 2 directly faces an observer, as shown in FIG. 5B.

The structure may better embody the advantages of the disclosure. Taking an optically variable film as an example, an absorbing layer of a common optically variable film is metal chromium, when traditional hot alkali liquor is adopted for hollowing, the absorbing layer is still reserved, so that after transferring, the observer may still observe the absorbing layer chromium, the whole appearance is dark gray, and the appearance effect is affected. When the absorbing layer of an alloy is adopted, a hollow area is completely corroded and is in a completely transparent state, so that a better optical effect may be realized.

In the embodiment, the lacquer layer 8 generally contains a solvent or the refractive index of the lacquer layer 8 is the same as or similar to the refractive index of a microstructure forming layer, when the lacquer layer 8 attaches to the upper surface of the optical anti-counterfeiting element 1, a grating microstructure 61 (for example, a wedge-shaped grating) in the hollow area is completely covered by the lacquer layer 8, due to the refractive index, the interface between the upper surface 11 of the grating microstructure 61 and the lacquer layer disappears and is represented by a dotted line in FIG. 5A, so that the surface shows a flat and uniform appearance, and a completely transparent effect is more favorably shown.

Figure 6A:
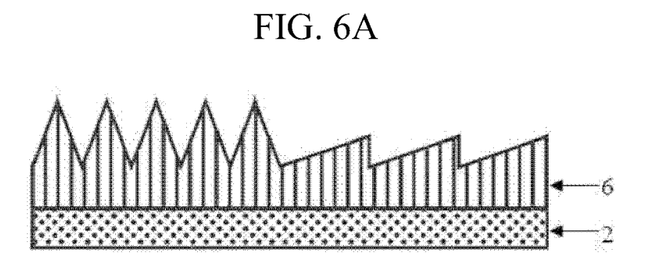
FIGS. 6A-6D show schematic diagrams of a manufacturing process of the optical anti-counterfeiting element according to another embodiment of the disclosure.
Figure 6B:
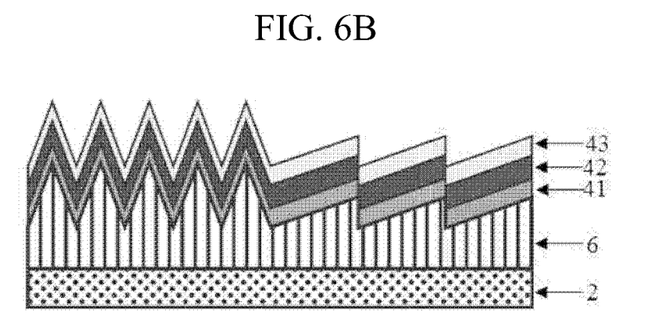
Figure 6C:
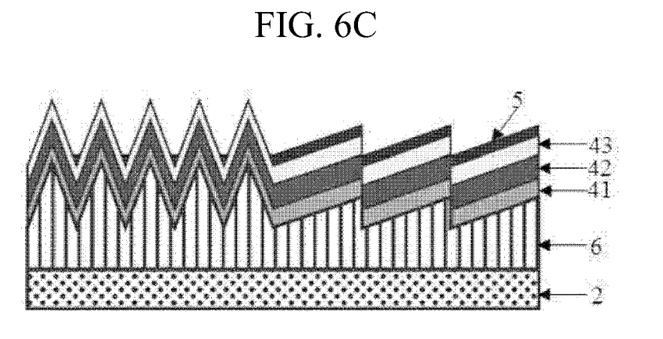
Figure 6D:
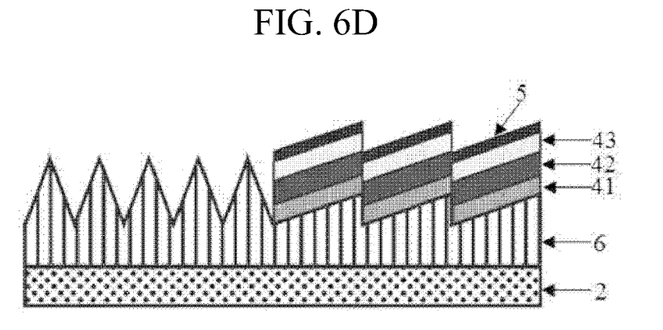

FIGS. 6A-6D show a manufacturing method of an optical anti-counterfeiting element 1. The method may include the following steps. (a): providing a transparent substrate 2; (b): forming a surface relief structure layer 6 on the substrate 2 in a thermal forming or ultraviolet curing manner, as shown in FIG. 6A; (c): sequentially depositing an alloy absorbing layer 41, a dielectric layer 42 and a reflecting layer 43 are sequentially on the surface relief structure layer 6, so that interference color layers of a Fabry-Perot filter structure are formed, as shown in FIG. 6B; (d): coating a protection layer 5 on one side of the reflecting layer 43, and the protection layer, for example, may be protective glue, as shown in FIG. 6C; (e): immersing the structure into a corresponding corrosive solution, so that an optically variable film of a hollow area is removed; (f): taking out the structure, and washing up the corrosive solution completely by using water or other solutions, and drying the structure, and thus the optical anti-counterfeiting element is obtained, as shown in FIG. 6D.

It is to be noted that the manufacturing method of the optical anti-counterfeiting element according to the embodiment is the same as or similar to the specific implementation details and benefits of the optical anti-counterfeiting element according to the above embodiment, and will not be elaborated here.

The optical anti-counterfeiting element according to the disclosure may also be used as a label, a logo, a wide strip, a transparent window, a coating film and the like, and may be adhered to various articles by various bonding mechanisms, for example, transferred to high security products such as banknotes and credit cards and high added value products.

The embodiment of the disclosure also provides anti-counterfeiting products, such as banknotes, credit cards, passports and securities, including the optical anti-counterfeiting element described above.

Alternative implementation modes of the embodiments of the disclosure are described in detail above with reference to the drawings, but the embodiments of the disclosure are not limited to specific details in the above implementation modes, various simple modifications may be made to the technical solutions of the embodiments of the disclosure within the scope of the technical idea of the embodiments of the disclosure, and these simple modifications all fall within the scope of protection of embodiments of the disclosure.

It is further to be noted that the various specific technical features described in the above detailed implementation modes may be combined in any suitable manner without contradiction. In order to avoid unnecessary repetition, the various possible combinations of the embodiments of the disclosure are not otherwise described.

Those skilled in the art should understand that all or part of the steps in the methods for implementing the embodiments may be completed by instructing related hardware through a program, and the program is stored in a storage medium, and includes a plurality of instructions enabling a single-chip microcomputer, chip, or processor to perform all or part of the steps of the methods described in the embodiments of the disclosure. The foregoing storage medium includes any medium that be store program codes, such as a U disk, a removable hard disk, a Read-Only Memory (ROM), a Random Access Memory (RAM), a magnetic disk, or an optical disc.

In addition, any combination of the various implementation modes of the embodiments of the disclosure may also be made, which should also be considered as disclosed as long as they do not depart from the idea of the embodiments of the disclosure.

What is claimed is:

1. An optical anti-counterfeiting element, comprising:
a substrate, wherein the substrate has a first surface and a second surface opposite to each other;
a surface relief structure layer, wherein the surface relief structure layer is located on the first surface of the substrate, and the surface relief structure layer comprises a first area and a second area, the first area is aligned with a hollow area of the optical anti-counterfeiting element and the second area is aligned with a non-hollow area of the optical anti-counterfeiting element, the first area comprises a first grating microstructure, the second area comprises a second grating microstructure and/or a flat structure, wherein a depth-to-width ratio of the first grating microstructure is greater than a depth-to-width ratio of the second grating microstructure, and/or a specific volume of the first grating microstructure is greater than a specific volume of the second grating microstructure; and
an interference color layer, wherein the interference color layer covers the second area homomorphically, the interference color layer is located in the non-hollow area of the optical anti-counterfeiting element, the interference color layers is a Fabry-Perot filter structure, an absorbing layer of the Fabry-Perot filter structure is in contact with the second area, and a material of the absorbing layer is an alloy.

2. The optical anti-counterfeiting element according to claim 1, wherein the alloy is formed by at least two metals, one metal forming the alloy is a gray metal, and another metal is a metal susceptible to corrosion by alkali liquor.

3. The optical anti-counterfeiting element according to claim 2, wherein the gray metal comprises one or more of chromium, nickel, copper, cobalt, titanium, vanadium, tungsten, tin, silicon, germanium, or a combination of chromium, nickel, copper, cobalt, titanium, vanadium, tungsten, tin, silicon and germanium; and the metal susceptible to corrosion by the alkali liquor comprises aluminum and/or iron.

4. The optical anti-counterfeiting element according to claim 1, wherein the alloy is one or more of the following: aluminum/chromium alloy, aluminum/nickel alloy, aluminum/silicon alloy, iron/chromium, or aluminum/iron/chromium alloy; and/or a thickness of the absorbing layer ranges from 2 nm to 30 nm.

5. The optical anti-counterfeiting element according to claim 1, wherein a material of a dielectric layer in the Fabry-Perot filter structure is a low-refractive-index material having a refractive index smaller than 1.8 or a high-refractive-index material having a refractive index greater than 1.8, and a material of a reflecting layer in the Fabry-Perot filter structure comprises one or more of the following: aluminum, silver, tin, nickel, chromium, platinum, copper, gold, silicon, or a combination of aluminum, silver, tin, nickel, chromium, platinum, copper, gold and silicon.

6. The optical anti-counterfeiting element according to claim 1, wherein the substrate is transparent or semitransparent.

7. The optical anti-counterfeiting element according to claim 1, further comprising a protection layer formed on the interference color layer.

8. The optical anti-counterfeiting element according to claim 1, wherein a feature size of the first grating microstructure and/or the second grating microstructure ranges from 100 nm to 100 μm; the depth-to-width ratio of the second grating microstructure is smaller than 0.2, and/or the specific volume of the second grating microstructure is smaller than 0.2; and/or the first grating microstructure and/or the second grating microstructure is one or more of the following: a sub-wavelength grating, a holographic grating, a blazed grating, a ball lens, or a cylindrical lens.

9. The optical anti-counterfeiting element according to claim 1, further comprising: a release layer formed between the substrate and the surface relief structure layer; and a lacquer layer covering the hollow area and/or the non-hollow area, and a surface of the lacquer layer is planarized.

10. A manufacturing method of an optical anti-counterfeiting element, comprising:
providing a substrate having a first surface and a second surface opposite to each other;
sequentially depositing an absorbing layer, a dielectric layer and a reflecting layer which are formed by an alloy on the first surface of the substrate, to form an interference color layer of a Fabry-Perot filter structure;
printing a protection layer on the reflecting layer;
immersing the structure formed in the preceding step into a corrosive solution corroding the interference color layer in a hollow area of the optical anti-counterfeiting element; and
taking out and washing the corroded structure.

11. A manufacturing method of an optical anti-counterfeiting element, comprising:
providing a substrate having a first surface and a second surface opposite to each other;
forming a surface relief structure layer on the first surface of the substrate, and the surface relief structure layer comprises a first area aligned with a hollow area of the optical anti-counterfeiting element and a second area aligned with a non-hollow area of the optical anti-counterfeiting element, the first area comprises a first grating microstructure, the second area comprises a second grating microstructure and/or a flat structure, wherein a depth-to-width ratio of the first grating microstructure is greater than a depth-to-width ratio of the second grating microstructure, and/or a specific volume of the first grating microstructure is greater than a specific volume of the second grating microstructure;
sequentially depositing an absorbing layer, a dielectric layer and a reflecting layer which are formed by an alloy on the surface relief structure layer, to form an interference color layer of a Fabry-Perot filter structure;
printing a protection layer on the reflecting layer;
immersing the structure formed in the preceding step into a corrosive solution corroding the interference color layer in the first area; and
taking out and washing the corroded structure.

12. The manufacturing method according to claim 11, wherein the alloy is formed by at least two metals, one metal forming the alloy is a gray metal, and another metal is a metal susceptible to corrosion by alkali liquor.

13. The manufacturing method according to claim 12, wherein the gray metal comprises one or more of the following: chromium, nickel, copper, cobalt, titanium, vanadium, tungsten, tin, silicon, germanium, or a combination of chromium, nickel, copper, cobalt, titanium, vanadium, tungsten, tin, silicon and germanium; and the metal susceptible to corrosion by alkali liquor comprises aluminum and/or iron.

14. The manufacturing method according to claim 11, wherein the alloy is one or more of the following: aluminum/chromium alloy, aluminum/nickel alloy, aluminum/silicon alloy, iron/chromium, or aluminum/iron/chromium alloy; and/or a thickness of the absorbing layer ranges from 2 nm to 30 nm.

15. The manufacturing method according to claim 11, wherein a material of the dielectric layer is a low-refractive-index material having a refractive index smaller than 1.8 or a high-refractive-index material having a refractive index greater than 1.8, and a material of the reflecting layer comprises one or more of the following: aluminum, silver, tin, nickel, chromium, platinum, copper, gold, silicon, or a combination of aluminum, silver, tin, nickel, chromium, platinum, copper, gold and silicon.

16. The manufacturing method according to claim 11, wherein the substrate is transparent or semitransparent.

17. The manufacturing method according to claim 11, wherein a feature size of the first grating microstructure and/or the second grating microstructure ranges from 100 nm to 100 μm; the depth-to-width ratio of the second grating microstructure is smaller than 0.2, and/or the specific volume of the second grating microstructure is smaller than 0.2; and/or the first grating microstructure and/or the second grating microstructure is one or more of the following: a sub-wavelength grating, a holographic grating, a blazed grating, a ball lens, or a cylindrical lens.

18. The manufacturing method according to claim 11, wherein each layer of the interference color layer of the Fabry-Perot filter structure is formed by one or more of the following methods: an evaporation deposition method, an electron beam evaporation deposition method, or a magnetron sputtering deposition method.

19. An optical anti-counterfeiting product, comprising the optical anti-counterfeiting element according to claim 1.

* * * * *